United States Patent Office 3,812,104
Patented May 21, 1974

3,812,104
5-ARYLSULFAMYL-ANTHRANILIC ACIDS

Lincoln Harvey Werner, Summit, N.J., assignor to Ciba-Geigy Corporation, Ardsley, N.Y.
No Drawing. Continuation-in-part of application Ser. No. 157,046, June 25, 1971, which is a continuation-in-part of application Ser. No. 149,027, June 1, 1971, both now abandoned, which is a continuation-in-part of application Ser. No. 91,224, Nov. 19, 1970, which is a continuation-in-part of application Ser. No. 832,029, June 10, 1969, now Patent No. 3,658,990, dated Apr. 25, 1972, which is a continuation-in-part of abandoned application Ser. No. 675,330, Oct. 16, 1967, which in turn is a continuation-in-part of abandoned application Ser. No. 598,980, Dec. 5, 1966. This application July 29, 1971, Ser. No. 167,531

Int. Cl. C07d 5/16
U.S. Cl. 260—239.6        6 Claims

ABSTRACT OF THE DISCLOSURE 5-arylsulfamyl-4-halo-anthranilic acids, e.g. those of the formula

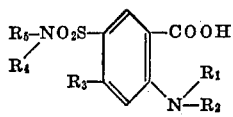

$R_1$ = aliphatic or araliphatic radical
$R_{2,4}$ = H or $R_1$
$R_3$ = Cl or Br
$R_5$ = carbo- or heterocyclic aryl and functional derivatives thereof, exhibit diuretic effects.

CROSS-REFERENCES TO RELATED APPLICATIONS

This is a continuation-in-part of application Ser. No. 157,046, filed June 25, 1971, (now abandoned) which in turn is a continuation-in-part of application Ser. No. 149,027, filed June 1, 1971, (now abandoned) which in turn is a continuation-in-part of application Ser. No. 91,224, filed Nov. 19, 1970, which in turn is a continuation-in-part of application Ser. No. 832,029, filed June 10, 1969, now U.S. Pat. No. 3,658,990 patented Apr. 25, 1972 which in turn is a continuation-in-part of application Ser. No. 675,330, filed Oct. 16, 1967 (now abandoned), which in turn is a continuation-in-part of application Ser. No. 598,980, filed Dec. 5, 1966 (now abandoned).

SUMMARY OF THE INVENTION

The present invention concerns and has for its object the provision of new 5 - arylsulfamyl-4-halo-anthranilic acids and their therapeutically acceptable derivatives, more particularly those of Formula I,

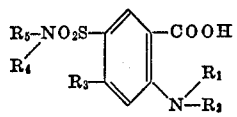

(I)

in which each of $R_1$, $R_2$ and $R_4$ is an aliphatic or araliphatic radical, $R_2$ and $R_4$ are also hydrogen, $R_3$ is chloro or bromo and $R_5$ is a carbo- or heterocyclic aryl radical, of esters, amides, acyl derivatives and/or salts thereof, as well as of corresponding pharmaceutical compositions, new starting materials and methods for the preparation and application of these products. Said compositions are primarily useful as orally applicable diuretic, natri- and chloriuretic agents in order to relieve excessive water and/or electrolyte retention, for example, in connection with heart and kidney diseases, and in the adjunctive management of hypertension.

DESCRIPTION OF THE PREFERRED EMBODIMENTS

The aliphatic or araliphatic radicals mentioned for $R_1$, $R_2$ and $R_4$ are hydrocarbon radicals, which may be substituted by functional groups and/or interrupted by heteroatoms, such as nitrogen, oxygen and/or sulfur atoms. Such radicals are, for example, lower alkyl, e.g. methyl, ethyl, n- or i-propyl, n-, i-, or sec. butyl, n- or i-pentyl, neopentyl, n-hexyl or n-heptyl, lower alkenyl, e.g. vinyl, allyl, methallyl or 2-butenyl, lower alkynyl, e.g. propargyl, mono- or bicyclic cycloalkyl, cycloalkenyl, cycloalkyl-lower alkyl or cycloalkenyl-lower alkyl with preferably 5 to 7 ring-carbon atoms, 1 to 4 chain carbon atoms and optional e.g. up to 4, lower alkyl groups, e.g. cyclopropyl, 2,3-dimethyl-cyclopropyl, cyclobutyl, cyclopentyl, 2- or 3-methyl-cyclopentyl, 2,5- or 3,4 - dimethyl-cyclopentyl, cyclohexyl, 2-, 3- or 4-methyl-cyclohexyl, 2,3-, 2,4- or 3,5-dimethyl-cyclohexyl, 2,4,6 - trimethyl-cyclohexyl, cycloheptyl, cyclooctyl, 2- or 7-norbornanyl, 1- or 2-decahydronaphthyl; 1- or 2-cyclopentenyl, 2,4-cyclopentadienyl, 2- or 3-methyl-2-cyclopentenyl, 4,5-dimethyl-2-cyclopentenyl, 1-, 2 or 3-cyclohexenyl, 2,5-cyclohexadienyl, 2-, 3- or 4-methyl-1- or 2-cyclohexenyl, 2,4- or 3,5-dimethyl-1- or 2-cyclohexenyl, 2,4,6-trimethyl-2,5-cyclohexadienyl, 1-, 2- or 3-cycloheptenyl, 2,6-cycloheptadienyl, 2-cyclooctenyl or 2-norborn-5-enyl, as well as the corresponding cycloalkyl- or cycloalkenyl-lower alkyl groups in which the chain especially represents methyl, but also ethyl n-, or i-propyl, n-, i- or sec. butyl; it contains in any of the positions available for substitution one of the specific cycloalkyl or cycloalkenyl groups listed above. The term "lower," referred to above and hereinafter in connection with organic radicals or compounds respectively, defines such with up to 7, preferably up to 4, carbon atoms. Aliphatic radicals that are substituted, e.g. by free or functionally converted hydroxy, mercapto or carboxy groups and/or interrupted by heteroatoms, e.g. one oxygen, sulfur and/or nitrogen atom, are represented, for example, by lower haloalkyl, e.g. 2-(chloro, bromo or iodo)-ethyl, 3,3-difluoro- or -dichloropropyl, 3,3,3-trichloropropyl, 3- or 4-chlorobutyl, 4,4- or 3,4 - dichlorobutyl or 4,4,4-trifluorobutyl; unsubstituted or halogenated lower alkoxy- or alkylthio-lower alkyl, such as 2-ethoxyethyl, 3-methoxy-propyl, 2-ethylthio-ethyl, 2 - (2,2-dichloroethoxy)-ethyl, 2-(2-chloroethoxy)-ethyl, 2-(2,2,2-trifluoroethylthio)-ethyl or 2-(2,2-dichloroethylthio)-ethyl; carbamyl-lower alkyl or N,N-dilower alkylcarbamyl-lower alkyl, such as carbamyl-methyl, N,N-dimethylcarbamyl-methyl, 2-carbamyl-ethyl or 2-N,N-diethylcarbamyl-ethyl; sec. or tert. amino-lower alkyl, such as mono- or di-lower alkylamino-lower alkyl, lower alkyleneimino-lower alkyl, lower monoazo-, oxa- or -thia-alkyleneimino-lower alkyl or N-lower alkyl-lower mono-azaalkyleneimino-lower alkyl, e.g. 2-ethylaminoethyl, 2-dimethylamino-ethyl, 3 - diethylamino-propyl, 2-pyrrolidinoethyl, 2-piperidino-ethyl, 2-(4-methyl-piperazino)-ethyl or 2-morpholino-ethyl, 5 to 7 ring-membered oxa-cycloalkyl or -cycloalkenyl, oxa-cycloalkyl- or -cycloalkenyl-lower alkyl, such as 3-tetrahydrofuryl, tetrahydrofuryl-2-methyl, (2-methyl-tetrahydrofuryl-2)-methyl, 2,3-dihydro- or tetrahydropyranyl-2-methyl.

$R_1$ and $R_2$ when taken together, may also represent lower alkylene or alkenylene, e.g. 1,2-ethylene, 1,3-propylene, 1,4-butylene, 1,4- or 1,5-pentylene, 1,5-, 2,5- or 1,6-hexylene or 2,6 - heptylene; 1,4 - but - 2 - enylene, 1,4- or 1,5 - pent - 2 - enylene, 1,5 - hex - 2 - enylene, 1,6-hex - 3 - enylene or 2,6 - hept - 3 - enylene; lower mono-aza-, -oxa- or -thiaalkylene or N-lower alkyl-monoaza-lower alkylene, e.g. 3-aza-, 3-oxa- or 3-thia-pentylene-(1,5), 3-methyl- or 3 - ethyl - 3 - aza-pentylene-(1,5), 3-aza-hexylene-(1,6) or 4-aza- or oxa-heptylene-(2,6). In the aliphatically substituted group

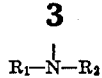

two heteroatoms, e.g. nitrogen, oxygen and/or sulfur atoms, are separated by at least 2 carbon atoms.

An araliphatic radical $R_1$, $R_2$ and $R_4$ preferably stands for mono- or bicyclic carbocyclic aryl-lower alkyl or aryl-lower alkenyl, especially (mono- or di-$R_6$-phenyl)-lower alkyl or -alkenyl, but also for mono- or bicyclic heterocyclic, especially monoaza-, oxa- or thiacyclic aryl-lower alkyl or aryl-lower alkenyl in which the alkyl or alkenyl moiety preferably has up to 4 chain carbon atoms, and the aromatic portion is unsubstituted or substituted by one or more than one, preferably 1 or 2, substituents selected, for example, from lower alkyl, e.g. that mentioned above, phenyl, free or functionally converted hydroxy or mercapto, such as lower alkoxy, lower alkylenedioxy, lower alkylthio or halogeno, e.g. methoxy, ethoxy, n- or i-propoxy or -butoxy, methylenedioxy, 1,1- or 1,2-ethylenedioxy, methyl- or ethylthio, fluoro, chloro or bromo; (hydroxy or halogeno)-lower alkyl or -alkoxy, e.g. 2-hydroxyethyl, trifluoromethyl or 2-hydroxyethoxy, nitro, amino, especially dilower alkylamino, e.g. dimethylamino or diethylamino, sulfamoyl, or free or functionally converted carboxy, e.g. lower carbalkoxy, carbamoyl or cyano. Preferred aryl-substituents $R_6$ are hydrogen, lower alkyl, hydroxy-lower alkyl, hydroxy, mercapto, lower alkoxy, lower alkylmercapto, hydroxy-lower alkoxy, halogeno, trifluoromethyl, nitro, amino, di-lower alkylamino, carboxy and/or lower carbalkoxy. Unsubstituted carbocyclic aralkyl or aralkenyl radicals are exemplified by benzyl, 1- or 2-phenylethyl, 1-, 2- or 3-phenyl-propyl, 2-phenyl-2-propyl, 1-, 2-, 3- or 4-phenyl-butyl, 1- or 2-phenyl-2-butyl, styryl or cinnamyl. In the corresponding heterocyclic aralkyl or aralkenyl radicals aryl is preferably monocyclic monoaza-, -oxa- or -thiacyclic aryl, e.g. 2-, 3- or 4-pyridyl, 2- or 3-furyl or -thienyl, but also 5-(1,2 - oxazolyl), 2 - (1,3 - oxazolyl), 2 - (1,3 - thiazolyl), 6-thianaphthyl or 2-benzimidazolyl. Araliphatic radicals are also partially hydrogenated, preferably bi- or tricyclic aryl radicals, bound at the aliphatic portion, such as 1- or 2-indolinyl, 1- or 2-(1,2,3,4-tetrahydronaphthyl) or 9-fluorenyl.

The radical $R_5$ preferably stands for mono- or bicyclic. carbocyclic or heterocyclic aryl, e.g. that mentioned for the above araliphatic radicals. It especially represents mono- or di-$R_6$-phenyl, in which $R_6$ has the meaning given above.

Esters and amides of the compounds of Formula I are particularly lower alkyl esters, the amide, mono- or di-loweralkylamides, (hydroxy or lower alkoxy)-lower alkyl esters or amides, (amino, mono- or di-lower alkylamino)-lower alkyl esters or amides, wherein two heteroatoms are separated by at least 2, preferably 2 or 3, carbon atoms, e.g. the methyl, ethyl, n- or i-propyl or -butyl ester, the amide, mono- or dimethylamide, diethylamide or i-propylamide, the 2 - (hydroxy or methoxy)-ethyl ester or amide, 2-(amino, mono- or dimethylamino)-ethyl ester or amide or 3-dimethylamino-propyl ester or amide, or aralkyl esters, such as ($R_6$-phenyl)-lower alkyl, e.g. benzyl, 1- or 2-phenethyl esters.

The acyl derivatives are preferably those of lower alkanoic acids, such as acetic, propionic, butyric or pivalic acid, but also of lower alkenoic acids, such as acrylic or methacrylic acid, or of $R_6$-phenyl-lower alkanoic or -alkenoic acids, such as benzoic, phenylacetic or cinnamic acid. The acyl group therein is preferably attached to a primary, but also a secondary amino group and/or a free hydroxy or mercapto group.

The compounds of the invention exhibit valuable pharmacological properties. Primarily they show diuretic, natri- and chloriuretic activity with rapid onset of action, high urine but low potassium excretion levels. This can be demonstrated in animal tests using, for example mammals, e.g. rats or dogs, as test objects. Such tests can be performed, for example, by administering the compounds of the invention within a gelatin capsule to dogs, or in the form of aqueous solutions or suspensions by stomach tube to rats, in an oral dosage range between about 0.1 and 100 mg./kg./day, preferably between about 0.3 and 50 mg./kg./day, advantageously between about 1 and 5 mg./kg./day. Simultaneously the test animals may receive various salt loads enterally or parenterally, for example, various amounts of subcutaneously applied 0.9% saline, e.g. 100 ml. thereof per medium-sized dog (beagle). Urine is then collected, e.g. at 2 hour intervals, with or without catheterization, and its volume, sodium, potassium and chloride content estimated and compared with that of the same untreated or saline-treated animals. Besides the above-mentioned utility, the compounds of the invention can also be used as intermediates in the preparation of other valuable products, primarily of pharmacologically active compounds.

Preferred are those compounds of Formula I in which $R_1$ is lower alkyl, lower alkenyl, cycloalkyl, cycloalkenyl. cycloalkyl-alkyl, cycloalkenyl-alkyl, oxa-cycloalkyl or -cycloalkenyl, oxacycloalkyl- or -cycloalkenyl-lower alkyl, with 5 to 7 ring-carbon and 1 to 4 chain carbon atoms, lower fluoro- or chloroalkyl, lower alkoxy- or alkylthio-lower alkyl, lower fluoro- or chloroalkoxy- or -alkylthio-lower alkyl, di-lower alkylamino- or lower-alkenyleneimino-lower alkyl, $R_2$ and $R_4$ are hydrogen, lower alkyl or (mono- or di-$R_6$-phenyl)-alkyl with 1 to 4 chain carbon atoms, $R_3$ is chloro and $R_5$ is mono- or di-$R_6$-phenyl or unsubstituted or lower alkyl-substituted monocyclic monoaza-, oxa- or -thiacyclic aryl, preferably pyridyl, furyl or thienyl, or especially those compounds of Formula I, in which $R_2$–$R_5$ have the meaning given in this paragraph and $R_1$ is (mono- or di-$R_6$-phenyl)-alkyl or unsubstituted or lower alkyl-substituted monocyclic monoaza-, -oxa- or -thiacyclic arylalkyl with 1 to 4 chain carbon atoms, or lower alkanoyl derivatives of compounds containing a primary or secondary amino group, or lower alkyl esters, the amide, mono- or di-lower-alkylamides, (hydroxy or lower alkoxy)-lower alkyl esters or amides, (amino, mono- or di-lower alkylamino)-lower alkyl esters or amides, wherein two heteroatoms are separated by at least 2 carbon atoms, the alkali metal, alkaline earth metal or ammonium salts of said anthranilic acids, or acid addition salts of basic compounds.

Especially valuable are the compounds of Formula II

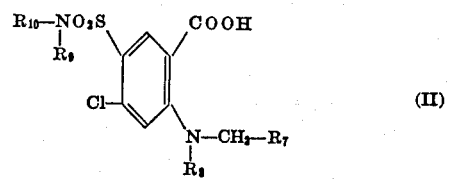

in which each of $R_7$ and $R_{10}$ is phenyl, mono- or di-lower alkylphenyl, lower hydroxyalkylphenyl, mono- or dihydroxyphenyl, lower alkylhydroxyphenyl, mono- or dimercaptophenyl, mono- or di-lower alkoxyphenyl, lower alkoxy-hydroxyphenyl, lower hydroxyalkoxyphenyl, mono- or di-lower alkylthiophenyl, mono- or di-halogenophenyl, trifluoromethylphenyl, nitrophenyl, mono- or diaminophenyl, dilower alkylaminophenyl, lower alkanoylaminophenyl, carboxyphenyl, lower carbalkoxyphenyl, pyridyl, lower alkylpyridyl, furyl, lower alkylfuryl, thienyl, lower alkylthienyl tetrahydrofuryl, lower alkyltetrahydrofuryl, dihydropyranyl or lower alkyldihydropyranyl, and each of $R_8$ and $R_9$ is hydrogen or lower alkanoyl, the lower alkyl esters, the amide, mono- or di-loweralkylamides, (hydroxy or lower alkoxy)-lower alkyl esters or amides (amino, mono- or di-lower alkylamino)-lower alkyl esters or amides, wherein two heteroatoms are separated by at least 2 carbon atoms, the alkali metal, alkaline earth metal, ammonium or acid addition salts thereof.

Outstanding are the compounds of Formula II, in which $R_7$ is phenyl, 2-furyl, 2-thienyl, 2-tetrahydrofuryl, 2-methyl-2-tetrahydrofuryl or 2,3-dihydro-2-pyranyl, each of $R_8$ and $R_9$ is hydrogen or acetyl and $R_{10}$ is phenyl, mono- or dimethylphenyl, 2-hydroxyethylphenyl, mono- or dihydroxyphenyl, methyl-hydroxyphenyl, mercaptophenyl, mono- or dimethoxyphenyl, methoxy-hydroxyphenyl, 2-hydroxyethoxyphenyl, fluorophenyl, chlorophenyl, trifluoromethylphenyl, nitrophenyl, mono- or diaminophenyl, dimethylaminophenyl, acetylaminophenyl, carboxyphenyl, carbomethoxyphenyl or carbethoxyphenyl, the methyl or ethyl ester, 3-dimethylaminopropylamide, the sodium, potassium or 2-hydroxyethylammonium salts of the carboxylic acids or the hydrochlorides of the mono- or diamino or dimethylamino compounds.

Most preferred are the N-furfuryl-5-phenylsulfamyl-4-chloro-anthranilic acid and the N-furfuryl-5-(hydroxy- or aminophenylsulfamyl)-4-chloro-anthranilic acid and their sodium salts or the hydrochloride of the aminophenyl compounds which, when given to dogs at oral doses between about 0.3 and 5 mg./kg./day, exhibit high diuretic, natri- and chloriuretic effects. Of these compounds the N-furfuryl-5-(2-aminophenylsulfamyl)-4-chloro-anthranilic acid, its sodium salt or hydrochloride, exhibit outstanding diuretic and saluretic effects at an even lower and narrower dosage range.

The compounds of the invention are prepared according to methods in themselves known. Advantageously they are obtained by converting in a compound of the Formula III

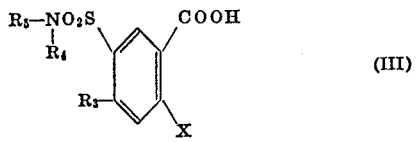

in which X stands for a group capable of being converted into the amino group

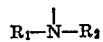

an ester, halide, amide, hydrazide, acyl derivative or salt thereof, X into

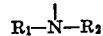

and hydrolyzing any resulting amide or hydrazide different from such defined above and, if desired, converting any resulting compound into another compound of the invention.

Any ester, amide, hydrazide or acyl derivative used as starting material may be such as described above for the final products. Generally, the amides or hydrazides used as starting material may be N-unsubstituted or N-substituted, for example, by one or more than one aliphatic, araliphatic or aromatic radical, e.g., any of those described above.

The group X, capable of being converted into

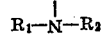

is preferably a halogen atom, advantageously fluoro or chloro, but also primary amino or an imino group, forming after reduction (of the corresponding Schiff's base) the group $R_1$—NH—. The starting material, in which X stands for halogeno, is reacted with the amine

that in which X stands for —$NH_2$, is reacted with a reactive ester of the alcohol $R_1$—OH, e.g. such of a hydrohalic or sulfonic acid, e.g. hydrochloric, hydrobromic, hydriodic, methane-, ethane-, benzene- or p-toluenesulfonic acid, whereas that starting material, in which X stands for said imino group, is subjected to hydrogenation, for example, with the use of catalytically activated or nascent hydrogen.

The above process is carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure.

In the above reaction the amine reagent is advantageously used in excess, in order to neutralize any generated acid. It may, however, also be used in equivalent amounts and in the presence of other condensing agents such as inorganic or organic bases, e.g. alkali metal carbonates or bicarbonates or tertiary nitrogen bases, for example tri-lower alkylamines, N,N-dimethyl-aniline or pyridine.

Any resulting amide or hydrazide can be hydrolyzed in the usual manner, for example, with the use of a base, e.g. an aqueous alkali or alkaline earth metal hydroxide, or a quaternary ammonium hydroxide. The compounds of the invention so obtained may be converted into each other according to known methods. For example, resulting compounds, in which $R_2$ and/or $R_4$ stands for hydrogen, may be reacted with a reactive ester of a corresponding alcohol, for example that of a hydrohalic or sulfonic acid. Resulting compounds with a hydroxy, prim. or sec. amino group may be acylated, for example, with a reactive functional derivative of a corresponding acid, such as a halide or anhydride thereof, e.g., thionyl or acetyl chloride or acetanhydride, resulting acyl derivatives or esters may be hydrolyzed, for example, with the use of acidic or alkaline hydrolyzing agents, resulting esters may be transesterified or reacted with corresponding amines or resulting acids esterified or amidated in known manner.

The compounds of the invention are obtained in the free form or in the form of their salts, depending on the conditions under which the process is carried out, the salts are also included in the present invention. These are particularly derived from the free acids and therapeutically useful inorganic or organic bases, primarily the alkali metal, alkaline earth metal, e.g. sodium, potassium, magnesium or calcium salts, or ammonium salts derived from ammonia or amines, such as those corresponding to the amino group

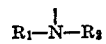

e.g., mono-, di- or tri-lower alkylamines, cycloalkylamines, -cycloalkyl-lower alkylamines or -aralkylamines, mixed amines or tertiary nitrogen bases, such as pyridine, collidine or lutidine. Resulting compounds that contain basic groups, e.g. amino groups, may also form acid addition salts, preferably such of therapeutically useful acids, such as mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxy-benzoic, salicylic, 4-aminosalicylic, embonic, nicotinic, methane-sulfonic, ethanesulfonic, hydroxyethanesulfonic, ethylenesulfonic, halogen-benzenesulfonic, toluenesulfonic, naphthalenesulfonic and sulfanilic acid; methionine, tryptophane, lysine and arginine.

The invention further includes any variant of the present process in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly those starting materials should be used in the reactions of the invention that lead to the formation of those compounds indicated above as being especially valuable.

The starting material is new and, therefore, a further object of the present invention. It can be prepared according to known methods, for example, a corresponding 2,4-dihalo-benzoic acid is reacted with chlorosulfonic acid in order to yield the 2,4-dihalo-5-chlorosulfonyl-benzoic acid. The latter, or a functional derivative thereof, is then reacted with the amine $R_4$—NH—$R_5$ in order to obtain the compounds of Formula III in which X stands for halogeno, or functional derivatives thereof. The latter, e.g. the esters, halides, amides or hydrazides, may also be prepared from the acids of Formula III by conventional methods. The resulting 2,4-dihalo-5-sulfamyl-benzoic acids may be reacted with ammonia in order to obtain the starting material in which X represents $NH_2$, which further may be reacted with a corresponding aldehyde or ketone, in order to obtain the starting material in which X stands for an imino group.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinyl-pyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples illustrating the invention are not to be construed as being limitations thereon. Temperatures are given in degrees centigrade and all parts wherever given are parts by weight.

Example 1

The mixture of 2.4 g. 2,4-dichloro-5-phenylsulfamyl-benzoic acid, 10 ml. 2-ethoxy-ethanol and 2.7 g. furfurylamine is refluxed for 4 hours under nitrogen. After cooling to room temperature it is poured into 50 ml. 2 N-hydrochloric acid. The supernatant liquid is decanted off and the residue dissolved in 50 ml. 2 N aqueous sodium hydroxide. The solution is extracted twice with diethyl ether and acidified with hydrochloric acid. The precipitate formed is filtered off and recrystallized from ethanol to yield the N-furfuryl-5-phenylsulfamyl-4-chloro-anthranilic acid of the formula

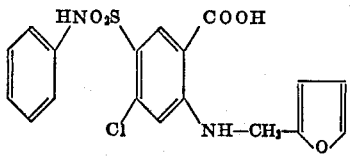

melting at 210–212° (dec.).

The starting material is prepared as follows: To 250 g. chlorosulfonic acid 50 g. 2,4-dichloro-benzoic acid are added portion-wise at room temperature while stirring. The solution obtained is heated to about 180° and stirred for 3 hours. After cooling to room temperature, it is poured onto ice, the mixture filtered, the residue washed with water, and dissolved in 400 ml. ethyl acetate. The solution is dried, filtered, evaporated, and the residue triturated with hexane, to yield the 2,4-dichloro-5-chlorosulfonyl-benzoic acid.

The mixture of 5.8 g. thereof, 7.5 g. aniline and 50 ml. ethyl acetate is stirred for 4 hours at room temperature. It is then filtered and the residue washed with ethyl acetate. The filtrate is evaporated in vacuo and the residue triturated with 2 N hydrochloric acid. The aqueous solution is decanted off and the precipitate dissolved in 100 ml. 10% aqueous potassium carbonate. The solution is filtered to yield residue A. The filtrate is extracted with diethyl ether and the aqueous layer acidified with hydrochloric acid. The precipitate formed is filtered off, washed with water and recrystallized from aqueous ethanol to yield the 2,4-dichloro-5-phenylsulfamyl-benzoic acid melting at 211–213°. Residue A is also recrystallized from aqueous ethanol to yield the 2,4-dichloro-5-phenylsulfamyl-benzoic acid phenylamide melting at 173–175°.

Example 2

The mixture of 3.0 g. N-furfuryl-5-phenylsulfamyl-4-chloro-anthranilic acid phenylamide, 30 ml. 2 N-aqueous sodium hydroxide, 10 ml. water and 10 ml. 2-methoxyethanol is refluxed for 3 hours under nitrogen and allowed to stand at room temperature overnight. It is poured into 60 ml. 2 N-hydrochloric acid, the precipitate formed filtered off, washed with water and dissolved in 35 ml. 10% aqueous potassium carbonate. The solution is extracted with ethyl acetate, the aqueous layer separated and acidified with hydrochloric acid. The precipitate formed is filtered off, recrystallized from aqueous ethanol to yield the N-furfuryl-5-phenylsulfamyl - 4 - chloro-anthranilic acid melting at 212–214° with decomposition; it is identical with the compound obtained according to Example 1.

The starting material is prepared as follows: The mixture of 6.0 g. 2,4-dichloro-5-phenylsulfamyl-benzoic acid phenylamide, 5.6 g. furfurylamine and 20 ml. 2-methoxyethanol is refluxed for 4 hours under nitrogen and allowed to stand overnight at room temperature. It is poured into 100 ml. 2 N-hydrochloric acid, the precipitate formed filtered off and the residue dissolved in diethyl ether. The solution is washed with 0.5 N hydrochloric acid, with 10% aqueous potassium carbonate and water, dried, filtered and evaporated in vacuo, to yield the N-furfuryl-5-phenylsulfamyl - 4 - chloro - anthranilic acid phenylamide melting at 114–117°.

Example 3

Substituting in Example 1 the furfurylamine by the equivalent amount of benzylamine and performing the reaction as shown therein, the N - benzyl - 5 - phenylsulfamyl-4-chloroanthranilic acid of the formula

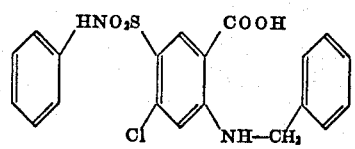

is obtained, M.P. 226–228° (from aqueous ethanol).

Example 4

The mixture of 3.1 g. 2,4-dichloro-5-(4-methyl-phenyl-sulfamyl)-benzoic acid, 3.4 g. furfurylamine and 10 ml.

2-methoxyethanol is refluxed for 4 hours under nitrogen. After cooling to room temperature, it is treated with 2 N-hydrochloric acid, the precipitate formed separated and dissolved in 2 N-aqueous sodium hydroxide. The solution is extracted with diethyl ether, the aqueous layer separated and acidified with hydrochloric acid. The precipitate formed is filtered off and recrystallized from aqueous ethanol to yield the N-furfuryl-4-chloro - 5 - (4-methyl-phenylsulfamyl)-anthranilic acid of the formula

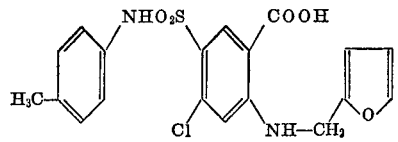

melting at 218–220.

The starting material is prepared as follows: To the solution of 5.8 g. 2,4-dichloro-5-chlorosulfonyl-benzoic acid in 50 ml. ethyl acetate, 8.6 g. p-toluidine are added while stirring, followed by 100 ml. ethyl acetate. The mixture is stirred at room temperature for 2 hours and refluxed for 2 hours while stirring. After cooling it is filtered, the residue washed with ethyl acetate and the filtrate evaporated *in vacuo*. The residue is treated with 10 ml. concentrated hydrochloric acid and extracted with ethyl acetate. The organic layer is separated, extracted with 10% aqueous potassium carbonate and the aqueous solution acidified with hydrochloric acid. The precipitate formed is filtered off, washed with water and recrystallized from aqueous ethanol to yield the 2,4-dichloro-5-(4-methyl-phenylsulfamyl)-benzoic acid melting at 202–204°.

Example 5

According to the method shown in the previous examples the compounds of Formula I, $R_1$=furfuryl, $R_2=R_4=H$, $R_3$=Cl, and listed below, are prepared from equivalent amounts of the corresponding starting materials of Formula III, $R_3=X=$Cl:

| Number | $R_5$ | M.P., final product, degrees | M.P., starting material, degrees |
|---|---|---|---|
| 1 | 4-CH$_3$O—C$_6$H$_4$ | [1] 208–209 | 224–226 |
| 2 | 4-F—C$_6$H$_4$ | [1] 207–208 | 231–233 |
| 3 | 2-Cl—C$_6$H$_4$ | [1] 201–203 | 168–170 |
| 4 | 3-Cl—C$_6$H$_4$ | [1] 216–218 | 190–192 |
| 5 | 4-Cl—C$_6$H$_4$ | [1] 218–220 | 238–240 |
| 6 | 3-CF$_3$—C$_6$H$_4$ | [1] 230–232 | 214–216 |
| 7 | 4-CF$_3$—C$_6$H$_4$ | [1] 223 | 238–239 |
| 8 | 4-NO$_2$—C$_6$H$_4$ | [1] 225 | 269–271 |
| 9 | 2-C$_6$H$_5$—C$_6$H$_4$ | [1] 188–189 | 175–176 |
| 10 | 4-HOCH$_2$CH$_2$—C$_6$H$_4$ | [1] 178–179 | 196–198 |
| 11 | 4-(CH$_3$)$_2$N—C$_6$H$_4$ | [1] 218 | [1] 168 |
| 12 | 3-CH$_3$CONH—C$_6$H$_4$ | [1] 147 | 238–241 |
| 13 | 3-NH$_2$—C$_6$H$_4$ | [1] 180 | [1] 179–198 |
| 14 | 4-CH$_3$CON—C$_6$H$_4$<br>                   \|<br>                   CH$_3$ | [1] 252 | 246–247 |
| 15 | 4-CH$_3$NH—C$_6$H$_4$ | [1] 199 | [1] 140 |

[1] Decomposition.

All compounds were recrystallized from aqueous ethanol.

Example 6

The mixture of 4.0 g. 2,4-dichloro-5-(4-acetylamino-phenylsulfamyl)-benzoic acid, 3.9 g. furfurylamine and 10 ml. 2-methoxy-ethanol is refluxed for 4 hours under nitrogen. After cooling it is treated with 2 N-hydrochloric acid, the residue formed separated and dissolved in 2 N-aqueous sodium hydroxide. The solution is extracted with diethyl ether, the aqueous layer separated, acidified with hydrochloric acid and the precipitate formed recrystallized from aqueous ethanol to yield the N-furfuryl-4-chloro-5-(4-acetylamino-phenylsulfamyl)-anthranilic acid of the formula

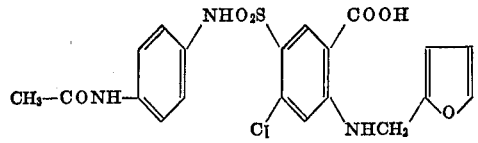

melting at 248° with decomposition.

The starting material is prepared as follows: To the solution of 5.8 g. 2,4-dichloro-5-chlorosulfonyl-benzoic acid in 50 ml. ethyl acetate, 12.0 g. 4-amino-acetanilide are added, followed by 50 ml. ethyl acetate. The mixture is stirred for 2 hours at room temperature and refluxed for 2 hours while stirring. After cooling to room temperature it is filtered, the residue (A) washed with ethyl acetate and the filtrate evaporated *in vacuo*. The residue (B) is triturated with water and 10 ml. concentrated hydrochloric acid, filtered off, washed with water and dried. The combined residues (A) and (B) are dissolved in 60 ml. 10% aqueous potassium carbonate, the solution washed with diethyl ether, acidified with hydrochloric acid, the precipitate formed filtered off and washed with water to yield the 2,4-dichloro-5-(4-acetylamino-phenylsulfamyl)-benzoic acid melting at about 150°.

Example 7

The mixture of 5.3 g. 2,4-dichloro-5-(4-amino-phenylsulfamyl)-benzoic acid hydrochloride, 5.4 g. furfurylamine and 15 ml. 2-methoxy-ethanol is refluxed for 4 hours under nitrogen and evaporated *in vacuo*. To the residue 30 ml. 2 N-hydrochloric acid are added and the precipitate formed filtered off. It is triturated with 40 ml. water at room temperature, filtered off, washed with a small amount of ice cold water and diethyl ether and recrystallized from aqueous ethanol to yield the N-furfuryl-4-chloro-5-(4-amino-phenylsulfamyl) - anthranilic acid hydrochloride of the formula

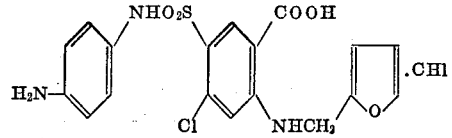

melting at about 230°.

The starting material is prepared as follows: The mixture of 7.1 g. 2,4-dichloro-5-(4-acetylamino-phenylsulfamyl)-benzoic acid (of Example 6) and 60 ml. 2 N-aqueous sodium hydroxide is refluxed for 90 minutes. After cooling to room temperature it is acidified with concentrated hydrochloric acid, the precipitate formed filtered off, the residue taken up in ethanol, the solution filtered and evaporated *in vacuo*, to yield the 2,4-dichloro-5-(4-amino-phenylsulfamyl)-benzoic acid hydrochloride, melting at 185° with decomposition.

Example 8

The mixture of 6.5 g. 2,4-dichloro-5-phenylsulfamyl-benzoic acid, 8.0 g. tetrahydrofuryl-2-methylamine and 30 ml. 2-methoxy-ethanol is refluxed for 4 hours under nitrogen. After cooling to room temperature, it is poured into 180 ml. 2 N-hydrochloric acid, the precipitate separated, ground in a mortar, filtered, washed with water and recrystallized several times from aqueous ethanol to yield the N - (tetrahydrofuryl-2-methyl)-4-chloro-5-phenylsulfamyl-anthranilic acid of the formula

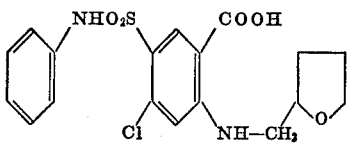

melting at 238–239°.

Example 9

The mixture of 3.5 g. 2,4-dichloro-5-phenylsulfamyl-benzoic acid, 4.6 g. (2-methyl-tetrahydrofuryl-2)-methylamine and 10 ml. 2-methoxy-ethanol is refluxed for 4 hours under nitrogen and stirred overnight at room temperature. Hereupon it is poured into 80 ml. 2 N-hydrochloric acid, the residue separated and dissolved in 2 N-aqueous sodium hydroxide. The solution is washed with diethyl ether, filtered and acidified with concentrated hydrochloric acid. The precipitate formed is filtered off and recrystallized from aqueous ethanol, to yield the N-(2-methyl-tetrahydrofuryl-2-methyl)-4-chloro - 5 - phenylsulfamyl-anthranilic acid of the formula

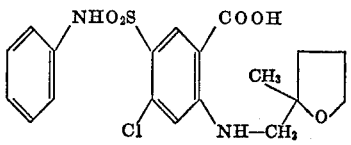

melting at 207–208°.

Example 10

The mixture of 6.5 g. 2,4-dichloro-5-phenylsulfamyl-benzoic acid, 9.05 g. 2,3-dihydro-pyranyl-2-methylamine and 30 ml. 2-methoxy-ethanol is refluxed for 4 hours under nitrogen. After cooling to room temperature it is poured into 180 ml. 2 N-hydrochloric acid, the precipitate formed filtered off, washed with water and recrystallized from aqueous ethanol, to yield the N-(2,3-dihydro-pyranyl-2-methyl)-4-chloro-5-phenylsulfamyl-benzoic acid of the formula

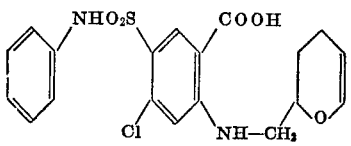

melting at 115–117° with decomposition.

Example 11

The mixture of 81.4 g. N-furfuryl-4-chloro-5-phenylsulfamyl-anthranilic acid (Example 1), 110 ml. 2 N aqueous sodium hydroxide and 100 ml. water is heated to about 50 to 60° until dissolution occurs. The solution is filtered, the filtrate cooled, seeded with a few crystals of previously prepared sodium salt, and allowed to stand in the refrigerator. The precipitate formed is filtered off, washed with a small amount of ice water and dissolved in 100 ml. isopropanol at 60°. The solution obtained is slowly cooled and finally kept in the refrigerator. The precipitate formed is filtered off, triturated with 75 ml. cold isopropanol, filtered again and dried to yield the sodium salt of the N - furfuryl-4-chloro-5-phenylsulfamyl-anthranilic acid, melting at 244 to 246° with decomposition.

Example 12

The mixture of 2.0 g. N-benzy-4-chloro-5-phenyl-sulfamyl-anthranilic acid, 2 ml. acetic acid anhydride and 8 ml. pyridine is heated at the steam bath for 1 hour, cooled and poured into water. The mixture is slightly acidified with concentrated hydrochloric acid, the precipitate formed filtered off and dissolved in ethanol. To the solution, water and a few drops hydrochloric acid are added, the precipitate formed filtered off and again recrystallized from aqueous ethanol to yield the N,N'-bisacetyl - N - benzyl - 4 - chloro - 5 - phenylsulfamyl-anthranilic acid of the formula

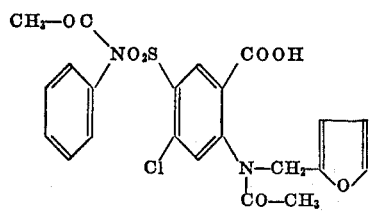

melting at 206–208°.

Example 13

The mixture of 113.3 g. 2,4-dichloro-5-phenylsulfamyl-benzoic acid, 500 ml. 2-methoxy-ethanol and 126.0 g. furfurylamine is stirred and refluxed under nitrogen for 4 hours. The cold mixture is then slowly poured into 2.5 liters 2 N hydrochloric acid while stirring. The precipitate formed is filtered off, washed with water and dissolved in 1 liter 2 N aqueous sodium hydroxide. The dark solution obtained is extracted three times with 125 ml. methylene chloride each and the aqueous layer carefully acidified with concentrated hydrochloric acid. The precipitate formed is filtered off, dissolved in 1 liter ethanol, the solution decolorized with charcoal, filtered hot, the filtrate combined with 1 liter hot water and, upon cooling to 15°, the N-furfuryl-4-chloro-5-phenylsulfamyl-anthranilic acid (Example 1) crystallizes. It is filtered off and dried; it melts at about 206°, which melting point can be raised to 208–210° by another recrystallization.

The starting material is prepared as follows: The mixture of 150 g. 2,4-dichloro-benzoic acid and 600 g. chlorosulfonic acid is heated to 150–155° for 3 hours while stirring. Thereupon, 223 g. chlorosulfonic acid are distilled off in vacuo and the cold residue poured into a mixture of 1.65 kg. ice and 125 ml. water. The precipitate formed is filtered off, washed with cold water, dissolved in 800 ml. ethyl acetate, the solution dried, filtered, and the filtrate diluted with 600 ml. ethyl acetate. To the solution obtained (containing the 2,4-dichloro-5-chlorosulfonyl-benzoic acid), cooled in a water bath, the mixture of 216 g. aniline and 220 ml. ethyl acetate is added at such rate that the temperature stays below 30°. The mixture is stirred for 4 hours at 25–30°, whereupon 4 g. charcoal are added. It is then filtered, the residue washed with 125 ml. ethyl acetate, the filtrate washed first with 450 ml. 3 N hydrochloric acid, then with 550 ml. water, and finally extracted with 700 ml. 7% aqueous sodium carbonate. The aqueous extract is separated, carefully acidified with concentrated hydrochloric acid and the precipitate formed filtered off and dried at 75° in vacuo, to yield the 2,4-dichloro-5-phenylsulfamyl-benzoic acid melting at 212–216°.

Example 14

The mixture of equivalent amounts of 2,4-dichloro-5-(2,3-dihydro-6-thianaphthylsulfamyl)-benzoic acid and 0.5 ml. benzylamine in 1 ml. 2-methoxy-ethanol is heated for 4 hours to 130°. After cooling, 5 ml. 2 N hydrochloric acid and 5 ml. water are added, the precipitate formed filtered off, washed with water and triturated with 2 N aqueous sodium hydroxide. The alkaline solution is filtered, the filtrate acidified with hydrochloric acid, the precipitate formed filtered off, washed with water and dried, to yield the N-benzyl-4-chloro-5-(2,3-dihydro-6-thianaphthylsulfamyl)-anthranilic acid of the formula

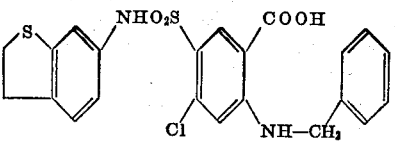

melting at 150° with decomposition.

The starting material is prepared as follows: To the solution of 1.9 g. 6-amino-2,3-dihydro-thianaphthene in 25 ml. ethyl acetate and 3 ml. pyridine, 2.9 g. 2,4-dichloro-5-chlorosulfonylbenzoic acid are added slowly while stirring. The mixture is stirred for 3 hours at room temperature and allowed to stand overnight. It is made strongly acidic with hydrochloric acid, extracted with ethyl acetate, the extract washed with water, dried and evaporated in vacuo. The residue is taken up in 1 N aqueous sodium hydroxide, the solution filtered and the filtrate acidified. The precipitate formed is filtered off and recrystallized first from aqueous ethanol and finally from methanol, to yield the 2,4-dichloro-5-(2,3-dihydro-6-thianaphthylsulfamyl)-benzoic acid.

Example 15

The mixture of 3.6 g. 2,4-dichloro-5-(N-methyl-N-phenylsulfamyl)-benzoic acid, 3.9 g. furfurylamine and 10 ml. 2-methoxyethanol is refluxed for 4 hours under nitrogen. After cooling, it is poured into 50 ml. 2 N hydrochloric acid, the precipitate formed filtered off, washed with water and heated with 50 ml. 2 N aqueous sodium hydroxide. To the suspension obtained, water and diethyl ether are added until 2 clear layers are formed. The aqueous layer is separated, washed with diethyl ether and acidified with hydrochloric acid. The precipitate formed is filtered off and recrystallized from aqueous ethanol, to yield the N-furfuryl-4-chloro-5-(N-methyl-N-phenylsulfamyl)-anthranilic acid of the formula

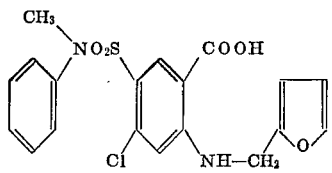

melting at 171–172°.

In the analogous manner, the N-benzyl-4-chloro-5-(N-methyl-N-phenylsulfamyl)-anthranilic acid is obtained; M.P. 164–166°.

The starting material is prepared as follows: To the solution of 11.6 g. 2,4-dichloro-5-chlorosulfonyl-benzoic acid in 100 ml. ethyl acetate, 17.1 g. N-methyl-aniline are added slowly, and the mixture is stirred at room temperature for 4 hours. It is then filtered, the filtrate evaporated in vacuo and the residue taken up in water and 20 ml. concentrated hydrochloric acid. The mixture is extracted with ethyl acetate, the extract washed with water and shaken with 10% aqueous potassium carbonate. The aqueous layer is separated, acidified with concentrated hydrochloric acid, the precipitate formed filtered off and recrystallized from aqueous ethanol to yield the 2,4-dichloro-5-(N-methyl-N-phenylsulfamyl)-benzoic acid, melting at 170–171°.

Example 16

The mixture of 3 g. N-benzyl-4-chloro-5-(N-methyl-N-phenylsulfamyl)-anthranilic acid (Example 15), 12 ml. pyridine and 3 ml. acetic acid anhydride is heated at the steam bath for 1 hour while stirring. After cooling, it is poured into 120 ml. water, the mixture acidified with concentrated hydrochloric acid, the precipitate collected and recrystallized from aqueous methanol to yield the N-acetyl-N-benzyl-4-chloro - 5 - (N-methyl-N-phenylsulfamyl)-anthranilic acid of the formula

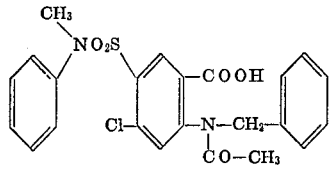

melting at 176–177° with decomposition.

Example 17

The mixture of equivalent amounts of 2,4-dichloro-5-phenylsulfamyl-benzoic acid and 9.7 g. N-methyl-benzylamine in 20 ml. 2-methoxy-ethanol is refluxed for 4 hours under nitrogen. After cooling, it is poured into 100 ml. 2 N-hydrochloric acid, the precipitate formed filtered off, washed with water and dissolved in 2 N aqueous sodium hydroxide. The mixture is extracted with diethyl ether, the aqueous layer separated and acidified with concentrated hydrochloric acid. The precipitate formed is filtered off and recrystallized from aqueous ethanol, to yield the N-methyl-N-benzyl-4-chloro-5-phenylsulfamyl-anthranilic acid of the formula

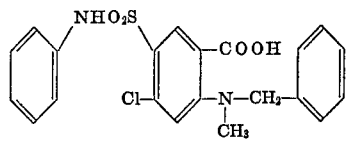

melting at 183–184° with decomposition.

Example 18

The mixture of 3 g. N-methyl-N-benzyl - 4 - chloro-5-phenylsulfamyl-anthranilic acid (Example 17), 12 ml. pyridine and 3 ml. acetic acid anhydride is heated at the steam bath for 1 hour while stirring. After cooling, it is poured into 120 ml. water, the mixture acidified with concentrated hydrochloric acid and the precipitate formed filtered off. The residue is dissolved in the minimum amount of hot ethanol, the solution filtered and allowed to cool to room temperature. The precipitate formed is filtered off and washed with aqueous ethanol to yield the N-methyl-N-benzyl-4-chloro - 5 - (N-acetyl-N-phenylsulfamyl)-anthranilic acid of the formula

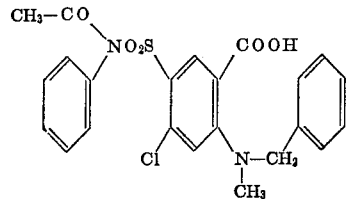

melting at 191–192° with decomposition.

Example 19

Preparation of 10,000 tablets each containing 50.0 mg. of the active ingredient:

| Formula: | G. |
| --- | --- |
| Sodium N-furfuryl - 4 - chloro-5-phenylsulfamyl-anthranilate | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water q.s. | |

Procedure: All the powders are passed through a screen with an opening of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

Example 20

The mixture of 2.2 g. methyl 4-chloro-5-phenylulfamyl-anthranilate and 12 ml. benzaldehyde is heated to 200° for 1 hour and evaporated in vacuo. The residue is triturated with 75 ml. ethylacetate, filtered off and the filtrate hydrogenated over 0.3 g. platinum dioxide at room temperature until the hydrogen uptake slows down (½ an hour). The mixture is filtered, the filtrate evaporated in vacuo, the residue taken up in chloroform-diethylamine (9:1) and chromatographed on silica gel, to yield as the main eluate the amorphous methyl N-benzyl-4-chloro-5-phenylsulfamylanthranilate of the formula

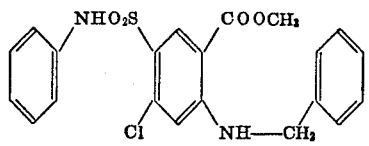

showing in the I.R.-spectrum bands, inter alia at 1750 and 1250 cm.$^{-1}$.

1.8 g. thereof are dissolved in 20 ml. methanol and 10 ml. 2 N aqueous sodium hydroxide, and the solution is refluxed for 20 minutes. It is then concentrated in vacuo, the aqueous concentrate diluted with water, extracted with diethyl ether and the aqueous layer acidified with hydrochloric acid. The precipitate formed is filtered off and recrystallized from aqueous ethanol, to yield the N-benzyl-4-chloro-5-phenylsulfamyl-anthranilic acid melting at 226–228°; it is identical with the product obtained according to Example 3.

The starting material is prepared as follows: The mixture of 1.0 g. 2,4-dichloro-5-phenylsulfamyl-benzoic acid and 25 ml. concentrated aqueous ammonia is heated in a sealed tube to 120° for 4 hours. Hereupon, it is evaporated in vacuo, the residue taken up in 25 ml. saturated anhydrous methanolic hydrochloric acid and the mixture gently refluxed for 1 hour. It is evaporated in vacuo and the residue recrystallized from methanol, to yield the methyl 4-chloro-5-phenylsulfamyl-anthranilate melting at 183–186°.

Example 21

The mixture of 2.0 g. methyl 4-chloro-5-phenylsulfamyl-anthranilate and 5 ml. benzyl chloride is refluxed for 2 hours and evaporated in vacuo. The residue is triturated with diethyl ether, filtered off and washed with diethyl ether to yield the methyl N-benzyl-4-chloro-5-phenylsulfamyl-anthranilate melting at about 200° (softening at 185°); it is identical with the compound obtained according to Example 20.

The mixture of 1.3 g. thereof, 5 ml. methanol, 5 ml. water and 1.5 ml. 6 N aqueous sodium hydroxide is heated at the steam cone for 30 minutes and allowed to stand at 25° for 1 hour. It is then concentrated in vacuo, the concentrate diluted with water, extracted with diethyl ether and the aqueous layer filtered. The filtrate is acidified with hydrochloric acid to pH 5, the precipitate formed filtered off and recrystallized from aqueous ethanol, to yield the N-benzyl-4-chloro-5-phenylsulfamyl-anthranilic acid melting at 226°; it is identical with the product obtained according to Example 3.

Example 22

To the suspension of 4.07 g. N-furfuryl-5-phenylsulfamyl-4-chloro-anthranilic acid and 50 ml. methanol, 0.61 g. 2-hydroxy ethylamine are added while stirring. The resulting yellowish solution is evaporated in vacuo, to yield the 2-hydroxyethylammonium N-furfuryl - 5 - phenylsulfamyl-4-chloro-anthranilate of the formula

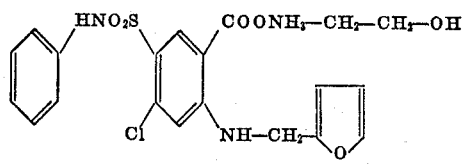

melting at 90°.

Example 23

The mixture of 13.1 g. ethyl 2,4-dichloro-5-phenylsulfamylbenzoate and 20.4 g. furfurylamine is heated for 1 hour to 110°. After cooling, it is poured into 210 ml. water, the mixture acidified with glacial acetic acid to pH 4.5 while keeping the temperature below 20°. The precipitate formed is filtered off, washed with water and suspended in 250 ml. 0.5 N sodium hydroxide while stirring at room temperature. It is filtered, the residue suspended in water and the mixture acidified with hydrochloric acid to pH 2 while stirring. It is again filtered and the residue recrystallized several times from aqueous ethanol and finally from anhydrous ethanol, to yield the ethyl N-furfuryl-5-sulfamyl-4-chloroanthranilate of the formula

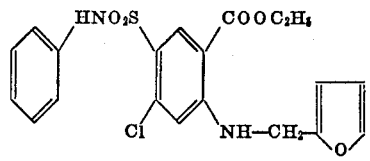

melting at 157–159°.

The starting material is prepared as follows: The mixture of 15 g. 2,4-dichloro-5-phenylsulfamyl-benzoic acid and 150 ml. 6 N ethanolic hydrochloric acid is refluxed for 90 minutes and allowed to stand in the cold. The precipitate formed is filtered off, and recrystallized from aqueous ethanol, to yield the ethyl 2,4-dichloro-5-phenylsulfamyl-benzoate melting at 132–133°.

Example 24

The mixture of 6.6 g. 2,4-dichloro-5-phenylsulfamylbenzoic acid 3-dimethylamino-propylamide, 5.8 g. furfurylamine and 15 ml. 2-methoxy-ethanol is refluxed for 4 hours under nitrogen and evaporated in vacuo. The residue is taken up in 100 ml. 2 N aqueous sodium hydroxide and the mixture extracted with ethyl acetate. The organic layer is dried, filtered and evaporated. The residue is triturated with hydrogen chloride in ethyl acetate, the precipitate formed filtered off and taken up in water. The solution is washed with ethyl acetate, filtered and made basic with 2 N aqueous sodium hydroxide. The mixture is extracted with ethyl acetate, the extract dried, filtered and evaporated, to yield the amorphous N-furfuryl-5-phenylsulfamyl-4-chloro-anthranilic acid 3-dimethylaminopropylamide of the formula

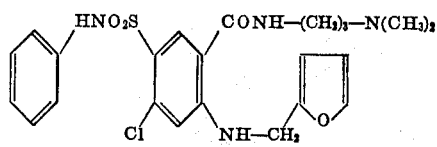

showing in the thin layer chromatogram on silica gel in chloroform, methanol and diethylamine (85:5:10) an $R_{cm}=7.5$.

The starting material is prepared as follows: To the mixture of 17.7 g. 2,4-dichloro-5-phenylsulfamyl-benzoic acid and 90 ml. 1,2-dimethoxyethane, 24 ml. thionyl chloride are added dropwise during 25 minutes while stirring, the whole is refluxed for 90 minutes and evaporated in vacuo. 18.6 g. of the resulting acid chloride is taken up in 300 ml. ethyl acetate and the solution added dropwise to the mixture of 11.8 g. 3-dimethylaminopropylamine and 450 ml. ethyl acetate while stirring, and stirring is continued overnight at room temperature. The mixture is filtered, the filtrate acidified with hydrogen chloride in ethyl acetate and the precipitate formed filtered off. It is taken up in water, the solution washed with ethyl acetate and made alkaline with 10% potassium carbonate. The mixture is extracted with ethyl acetate, the mixture dried, filtered and evaporated, to yield the 2,4-dichloro-5-phenylsulfamyl - benzoic acid 3 - dimethylamino-propylamide melting between about 80 and 90°,

Example 25

The mixture of 3.6 g. 2,4-dichloro-5-(4-hydroxyphenyl-sulfamyl)-benzoic acid, 10 ml. 2-methoxy-ethanol and 3.9 g. furfurylamine is refluxed for 4 hours under nitrogen. After cooling, it is poured into 50 ml. 2 N hydrochloric acid, the precipitate formed filtered off, washed with water and taken up in 2 N aqueous sodium hydroxide. The mixture is washed with diethyl ether, filtered and the filtrate acidified with concentrated hydrochloric acid. The precipitate formed is filtered off and recrystallized from aqueous ethanol, to yield the N-furfuryl-4-chloro-5-(4-hydroxyphenylsulfamyl)-anthranilic acid of the formula

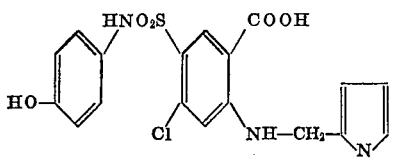

melting at 227° with decomposition.

The starting material is prepared as follows: To the mixture of 5.8 g. 2,4-dichloro-5-chlorosulfonyl-benzoic acid and 100 ml. ethyl acetate, 8.7 g. 4-hydroxyaniline are added portionwise and the mixture stirred at room temperature for 4 hours. After standing overnight, it is filtered, the residue suspended in 50 ml. water, the mixture acidified with 10 ml. concentrated hydrochloric acid and extracted with ethyl acetate. The extract is filtered, washed with water and shaken with 10% aqueous potassium carbonate. The aqueous solution is filtered, acidified with concentrated hydrochloric acid and the precipitate formed filtered off. It is recrystallized several times from aqueous ethanol, to yield the 2,4-dichloro-5-(4-hydroxyphenylsulfamyl)-benzoic acid melting at 233–235°.

Example 26

In the manner described in Example 25, the N-furfuryl-4-chloro-5-(2-hydroxyphenyl-sulfamyl)-anthranilic acid, M.P. 125° (dec.) and the N-furfuryl-4-chloro-5-(3-hydroxyphenylsulfamyl)-anthranilic acid, M.P. 202° (dec.) are prepared from the same amounts of the corresponding isomeric starting materials, which melt at 187–189° and 192–194° respectively.

Example 27

The mixture of 3.9 g. 2,4-dichloro-5-(3,4-dimethoxyphenylsulfamyl)-benzoic acid, 10 ml. 2-methoxyethanol and 3.7 g. furfurylamine is refluxed for 4 hours under nitrogen. After cooling, it is poured into 50 ml. 2 N hydrochloric acid, the precipitate formed filtered off, washed with water and taken up in 2 N aqueous sodium hydroxide. The mixture is washed with diethyl ether, filtered, the filtrate acidified with concentrated hydrochloric acid, the precipitate formed collected and recrystallized two times from aqueous ethanol, to yield the N-furfuryl-4-chloro-5-(3,4-dimethoxyphenylsulfamyl)-anthranilic acid of the formula

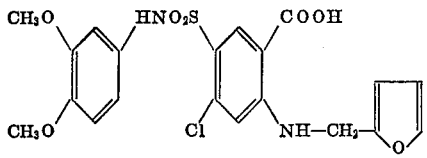

melting at 123°.

The starting material is prepared as follows: To the solution of 12.3 g. 3,4-dimethoxyaniline and 50 ml. ethyl acetate, 5.8 g. 2,4-dichloro-5-chlorosulfonyl-benzoic acid are added while stirring, and the mixture stirred for 4 hours at room temperature. It is filtered, the residue washed with ethyl acetate and the filtrate combined with 10 ml. water and concentrated hydrochloric acid each and diluted with ethyl acetate. The organic layer is separated, extracted with 10% aqueous potassium carbonate and the extract acidified with concentrated hydrochloric acid. The precipitate formed is filtered off and recrystallized two times from aqueous ethanol, to yield the 2,4-dichloro-5-(3,4-dimethoxyphenylsulfamyl) - benzoic acid melting at 202–203°.

Example 28

In the manner described in Example 27, the N-furfuryl-4-chloro - 5 - (2,4-dimethoxyphenylsulfamyl)-anthranilic acid, M.P. 103° and the N-furfuryl-4-chloro - 5 - (2,5-dimethoxyphenylsulfamyl)-anthranilic acid, M.P. 199–202° are prepared from the same amounts of the corresponding isomeric starting materials, which melt at 184–185° and 180–182° respectively.

Example 29

Analogous to the procedures illustrated in the previous examples, more particularly according to Example 25, the N-furfuryl-4-chloro-5-[4-mercaptophenyl, 3,4-dihydroxyphenyl, 3-methyl-4-hydroxyphenyl, 3-methoxy-4-hydroxyphenyl, 4-(2-hydroxyethyl)-phenyl, 4-(2-hydroxyethoxy)-phenyl, 4-carboxyphenyl, 4-carbomethoxyphenyl or 4-carbethoxyphenyl]-sulfamyl-anthranilic acid or, according to Example 7, the N-furfuryl-4-chloro-5-[2- or 3-aminophenyl, 3,5-diaminophenyl, 4-dimethylaminophenyl or 4-diethylaminophenyl]-sulfamyl-anthranilic acid, their sodium, potassium or 2-ethanolammonium salts or the hydrochlorides of the aminophenyl compounds, are prepared from equivalent amounts of the corresponding starting materials.

Example 30

Preparation of 1,000 capsules, each containing 25 mg. of the active ingredient:

| Formula: | G. |
|---|---|
| N-furfuryl-4-chloro - 5 - (4 - hydroxyphenylsulfamyl)-anthranilic acid | 25.0 |
| Lactose | 220.0 |

Procedure: The ingredients are intimately mixed in a suitable mixer, passed through a screen with openings of 0.6 mm., re-mixed and 245 mg. are filled into No. 3 hard shell gelatin capsules.

In the analogous manner, capsules are prepared containing per unit 75 mg. N-furfuryl-4-chloro-5-(4-methoxyphenylsulfamyl) anthranilic acid or N-furfuryl-4-chloro-5-(4-aminophenylsulfamyl)-anthranilic acid hydrochloride and 170 mg. lactose.

Example 31

Preparation of 10,000 tablets, each containing 50 mg. of the active ingredient:

| Formula: | G. |
|---|---|
| N-furfuryl-4-chloro - 5 - phenylsulfamyl-anthranilic acid | 500.0 |
| Lactose | 2,500.0 |
| Microcrystalline cellulose | 1,000.0 |
| Corn starch | 160.0 |
| Magnesium stearate | 40.0 |
| Purified water q.s. | |

Procedure: All the powders, except the starch and the magnesium stearate, are passed through a screen with 0.6 mm. openings and mixed in a suitable mixer. The starch is suspended in 160 ml. water and the suspension added to 200 ml. boiling water. The paste formed is added to the powders which are granulated, if necessary, with an additional amount of water. The granulate is dried overnight at 35°, broken on a screen with 1.2 mm. openings, the magnesium stearate added, mixed well and the granulate compressed into 420 mg. tablets using concave punches with 7.1 mm. diameter, uppers bisected.

Example 32

The mixture of 5.5 g. of 2,4-dichloro-5-(4-carbethoxyphenylsulfamyl)-benzoic acid, 10 ml. of 2-methoxy-ethanol and 5 g. of furfurylamine is refluxed for 4 hours under nitrogen. After cooling, it is poured onto 50 ml. of 2 N aqueous hydrochloric acid. The precipitate formed is filtered, washed with water and taken up in 2 N aqueous sodium hydroxide. The mixture is washed with diethyl ether, filtered and the filtrate acidified with concentrated hydrochloric acid. The precipitate formed is collected on a filter and recrystallized from aqueous ethanol, to yield the N-furfurylchloro - 5 - (4-carbethoxyphenylsulfamyl)-anthranilic acid of the formula

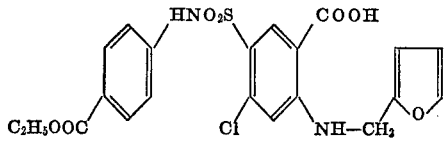

melting at 217° with decomposition.

The starting material is prepared as follows:

To the solution of 16.5 g. of 4-aminobenzoic acid ethyl ester in 100 ml. of ethyl acetate is added portionwise at room temperature 7.2 g. of 2,4-dichloro-5-chlorosulfonyl-benzoic acid. The mixture is allowed to stir for one hour at room temperature, then refluxed for 6 hours. After cooling, the solids are filtered off and washed with ethyl acetate. The filtrate is evaporated under reduced pressure. The residue is treated with water and 15 ml. of concentrated hydrochloric acid and then extracted with ethyl acetate. The ethyl acetate solution is extracted with 3 portions, 50 ml. each, of 10% aqueous potassium carbonate. The carbonate extracts are combined, filtered and acidified with concentrated hydrochloric acid. The precipitate formed is filtered, washed and recrystallized from aqueous ethanol to afford the 2,4-dichloro-5-(4-carbethoxyphenyl-sulfamyl)-benzoic acid melting at 226–228°.

Example 33

In an analagous manner as in Example 33, 4.7 g. of 2,4-dichloro-5-(4 - carboxyphenylsulfamyl)-benzoic acid reacted with 4.7 g. of furfurylamine in 10 ml. of 2-methoxy-ethanol affords on recrystallization from aqueous ethanol the N-furfuryl-4-chloro-5-(4 - carboxyphenylsul-famyl)-anthranilic acid melting at 264° with decomposition.

The starting material is prepared by the hydrolysis of the 2,4-dichloro-5-(4-carbethoxyphenylsulfamyl)-benzoic acid (Example 33) and melts at 288° with decomposition.

Example 34

The mixture of 5 g. of N-(4-carboxyphenyl)-2,4-di-chloro-5-(4-carboxyphenylsulfamyl)-benzamide, 5 g. of furfurylamine and 10 ml. of 2-methoxy-ethanol is refluxed for 4 hours under nitrogen. After cooling, it is poured onto 50 ml. of 2 N aqueous hydrochloric acid. The precipitate formed is filtered, washed with water and taken up in 2 N aqueous sodium hydroxide. The mixture is washed with diethyl ether, filtered and the filtrate acidified with concentrate hydrochloric acid to precipitate a syrupy material. The mixture is decanted and the product treated with a 1:1 mixture of ethanol and water. Recrystallization of the solids from a 1:1 ethanol-water mixture gives as a first crop the N-(4-carboxyphenyl)-2-(N-furfurylamino)-4-chloro-5-(4-carboxyphenylsulfamyl)-anthranilamide of the formula

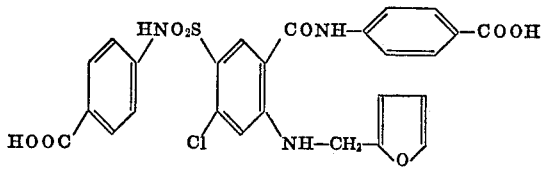

melting at 246° with decomposition. The material obtained on evaporation of the recrystallization solvent corresponds to the product of Example 34.

The starting material is prepared as follows:

The solution of 7.2 g. of 4-aminobenzoic acid in 150 ml. of ethyl acetate is treated with 7.2 g. of 2,4-dichloro-5-chlorosulfonyl-benzoic acid. The mixture is then refluxed for 6 hours. After cooling, the solids are filtered off and washed with ethyl acetate. The filtrate is evaporated under reduced pressure. The residue is treated with water and 15 ml. of concentrated hydrochloric acid and then extracted with ethyl acetate. The ethyl acetate solution is extracted with 3 portions, 50 ml. each, of 10% aqueous potassium carbonate. The carbonate extracts are combined, filtered and acidified with concentrated hydrochloric acid. The crystalling material obtained is ground and treated with a 1:2 ethanol-water mixture, filtered, washed and dried to afford a mixture of the N-(4-carboxyphenyl)-2,4 - dichloro - 5 - (4 - carboxyphenylsulfamyl)-benzam-ide and the 2,4 - dichloro-5-(4-carboxyphenylsulfamyl)-benzoic acid.

Example 35

The mixture of 5.3 g. of 2,4-dichloro-5-(2-amino-phenylsulfamoyl)-benzoic acid hydrochloride, 5.4 g. of furfurylamine and 15 ml. of 2-methoxy-ethanol is refluxed for 4 hours under nitrogen and evaporated under reduced pressure. To the residue 30 ml. of 2 N hydrochloric acid are added, the precipitate formed filtered off and washed with a small amount of ice cold aqueous ethanol, to yield the N-furfuryl - 4 - chloro-5-(2-aminophenylsulfamoyl)-anthranilic acid hydrochloride of the formula

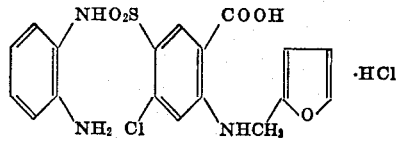

melting at 208° with decomposition.

The starting material is prepared as follows: To the solution of 5.8 g. of 2,4-dichloro-5-chlorosulfonyl-benzoic acid in 50 ml. of ethyl acetate, 12.0 g. of 2-amino-acet-anilide are added, followed by 50 ml. of ethyl acetate. The mixture is stirred for 2 hours at room temperature and refluxed for 2 hours while stirring. After cooling to room temperature it is filtered, the residue (A) washed with ethyl acetate and the filtrate evaporated under reduced pressure. The residue (B) is triturated with water and 10 ml. of concentrated hydrochloric acid, filtered off, washed with water and dried. The combined residues (A) and (B) are dissolved in 60 ml. of 10% aqueous potassium carbonate, the solution washed with diethyl ether, acidified with hydrochloric acid, the precipitate formed filtered off and washed with water to yield the 2,4-di-chloro - 5 - (2-acetylamino-phenylsulfamoyl)-benzoic acid melting at 222–225°.

The mixture of 7.1 g. thereof and 60 ml. of 2 N-aqueous sodium hydroxide is refluxed for 90 minutes. After cooling to room temperature it is acidified with concentrated hydrochloric acid, the precipitate formed filtered off, the residue taken up in ethanol, the solution filtered and evaporated under reduced pressure, to yield the 2,4-dichloro-5-(2-aminophenylsulfamoyl)-benzoic acid hydrochloride.

Example 36

The mixture of 46 g. of N-furfuryl-4-chloro-5-(2-amino-phenylsulfamoyl)-anthranilic acid hydrochloride, 110 ml. of 2 N aqueous sodium hydroxide and 100 ml. of water is heated to about 50 to 60° until dissolution occurs. The solution is filtered, the filtrate concentrated, cooled, seeded with a few crystals of previously prepared sodium salt, and allowed to stand in the refrigerator. The precipitate formed in filtered off, washed with a small amount of ice water and isopropanol, to yield the sodium N-furfuryl-4 - chloro-5-(2 - aminophenylsulfamoyl)-an-thranilate of the formula

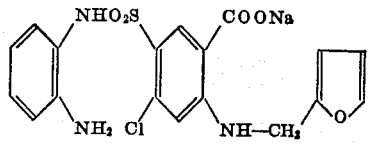

melting at 190° with decomposition.

Example 37

The mixture of 15 g. of N-furfuryl-4-chloro-5-(2-acetylaminophenylsulfamoyl)-anthranilic acid and 90 ml. of 2 N aqueous sodium hydroxide is refluxed for 2½ hours in a nitrogen atmosphere, cooled and acidified with glacial acetic acid. The solids formed are collected on a filter, washed with water and recrystallized from aqueous ethanol, to afford the monosodium di-[N-furfuryl-4-chloro-5-(2-aminophenylsulfamoyl)-anthranilate] of the formula

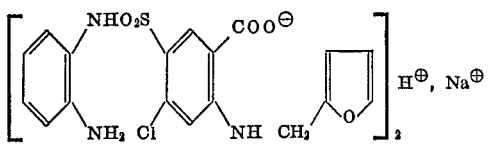

melting at 246–248°.

The starting material is prepared as follows:

To the solution of 50 g. of 2-aminoacetanilide and 100 ml. of dimethylformamide are added portionwise 30 g. of 2,4-dichloro-5-chlorosulfonyl-benzoic acid at 20°. The reaction mixture is warmed to 40° for 2 hours, evaporated under reduced pressure and the residue poured into 500 ml. of water and 7 ml. of concentrated hydrochloric acid. The solids formed are collected on a filter, washed with water and dilute aqueous hydrochloric acid, and triturated with aqueous ethanol, to give the 2,4-dichloro-5-(2 - acetylaminophenylsulfamoyl)-benzoic acid melting at 222–225°.

The mixture of 30 g. thereof, 30 g. of furfurylamine and 75 ml. of 2-methoxy-ethanol is refluxed for 4 hours under nitrogen. It is concentrated to half its volume under reduced pressure and is then poured onto 250 ml. of 2 N aqueous hydrochloric acid with stirring. The precipitate formed is filtered, washed with water, triturated with a 1:1 mixture of ethanol and water at 70° and repeated with 95% aqueous ethanol, to give the N-furfuryl-4-chloro-5-(2 - acetylaminophenylsulfamoyl)-anthranilic acid melting at 221–225°.

Example 38

The mixture of 4 g. of N-benzyl-4-chloro-5-(2-acetylaminophenylsulfamoyl)-anthranilic acid and 24 ml. of 2 N aqueous sodium hydroxide is refluxed for 6 hours under nitrogen and allowed to stand overnight at room temperature. It is combined with 4.5 ml. of glacial acetic acid (pH~5.5), the precipitate formed filtered off, washed with cold water and taken up in 25 ml. of hot water containing 1 ml. of glacial acetic acid. The mixture is stirred, slowly cooled to room temperature, filtered, the residue washed with water, taken up in 70 ml. of hot ethanol and the solution diluted with 70 ml. of water, to yield the N-benzyl-4-chloro-5-(2-aminophenylsulfamoyl)-anthranilic acid of the formula

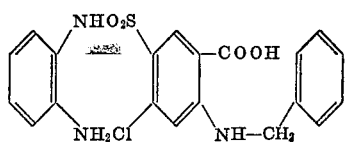

melting at 227° with decomposition.

The starting material is prepared as follows:

The mixture of 8.1 g. of 2,4-dichloro-5-(2-acetylaminophenylsulfamoyl)-benzoic acid, 20 ml. of 2-methoxy-ethanol and 8.6 g. of benzylamine is refluxed for 4 hours under nitrogen. It is cooled, poured into 100 ml. 2 N hydrochloric acid, the precipitate formed filtered off and washed with water. It is dissolved in 70 ml. of warm 2 N aqueous sodium hydroxide, the solution washed with diethyl ether, filtered and the filtrate acidified with concentrated hydrochloric acid. The precipitate formed is filtered off and twice boiled with 100 ml. of 50% aqueous ethanol, to yield the N-benzyl-4-chloro-5-(2-acetylaminophenylsulfamoyl)-anthranilic acid melting at 240° with decomposition.

Example 39

The mixture of 3.9 g. of N-(2-thenyl)-4-chloro-5-(2-acetylaminophenylsulfamoyl)-anthranilic acid and 24 ml. of 2 N aqueous sodium hydroxide is refluxed for 6 hours under nitrogen and allowed to stand overnight at room temperature. It is combined with 4.5 ml. of glacial acetic acid, the precipitate formed filtered off, washed with cold water and triturated in 25 ml. water containing 1 ml. of glacial acetic acid. The mixture is filtered, the residue washed with water and recrystallized from 50% aqueous ethanol, to yield the N-(2-thenyl)-4-chloro-5-(2-aminophenylsulfamoyl)-anthranilic acid of the formula

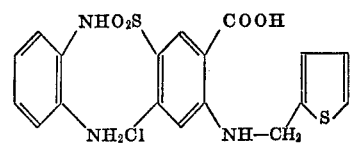

melting at 197° with decomposition.

In the exact analogous manner, the N-(3-thenyl)-4-chloro-5-(2-aminophenylsulfamoyl)-anthranilic acid of the formula

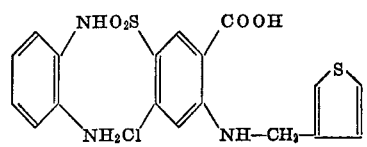

is prepared, M.P. 192° (dec.).

The starting material is prepared as follows: The mixture of 7.8 g. of 2,4-dichloro-5-(2-acetylaminophenylsulfamoyl)-benzoic acid, 20 ml. of 2-methoxy-ethanol and 8.8 g. of 2-thenylamine is refluxed for 4 hours under nitrogen. It is cooled, poured into 100 ml. 2 N hydrochloric acid, the precipitate formed filtered off and washed with water. It is dissolved in 70 ml. of warm 2 N aqueous sodium hydroxide, the solution washed with diethyl ether, filtered and the filtrate acidified with concentrated hydrochloric acid. The precipitate formed is filtered off and recrystallized from 50% aqueous ethanol, to yield the N-(2-thenyl)-4-chloro-5-(2-acetylaminophenylsulfamoyl)-anthranilic acid, melting at 239° with decomposition. The corresponding 3-thenyl isomer melts at 243° (dec.).

Example 40

The mixture of 43.8 g. of N-furfuryl-4-chloro-5-(2-acetylaminophenylsulfamoyl)-anthranilic acid, 250 ml. of 2 N aqueous sodium hydroxide and 4.9 g. of activated charcoal is stirred for 10 minutes at 50° under nitrogen. It is filtered, the residue washed with 45 ml. of 2 N aqueous sodium hydroxide, the filtrate refluxed for 7 hours under nitrogen and stirred over night at room temperature. It is again heated to reflux, combined with 47.5 ml. of glacial acetic acid, cooled to 20° and stirred for 1 hour. The suspension obtained is filtered, the residue washed with 25 ml. of water, and stirred for 1½ hours in 200 ml. of water containing 10 ml. of glacial acetic acid. The mixture is again filtered, the residue washed twice with 25 ml. of water, dried and taken up in 270 ml. of boiling anhydrous ethanol. The solution is filtered hot, the filtrate slowly cooled, stirred for 16 hours at 0° and the suspension formed filtered, to yield the N-furfuryl-4- chloro - 5 - (2 - aminophenylsulfamoyl)-anthranilic acid melting at 219–221° with decomposition.

The starting material is prepared as follows:

To the mixture of 134.3 g. of 2-amino-acetanilide and 400 ml. of dimethylformamide, 130 g. of 2,4-dichloro-5-chlorosulfonylbenzoic acid are added during 10 minutes while stirring and keeping the temperature between 25 and 30°. After ½ hour the mixture is slowly poured into the solution of 62 ml. of concentrated hydrochloric acid in 5.3 l. of water, the suspension stirred for 1 hour at 25°, filtered and the residue washed with 200 ml. of anhydrous ethanol. It is taken up in 160 ml. of dimethylformamide at 80°, 48 ml. of water are added the solution immediately cooled to 15°. The precipitate formed is filtered off, washed twice with 52 ml. of anhydrous ethanol, slurried with 760 ml. of anhydrous ethanol at 50° for 10 minutes, the mixture cooled to 25° and filtered, to yield the 2,4-dichloro-5-(2-acetylaminophenylsulfamoyl)-benzoic acid melting at 225–227°.

The solution of 20 g. thereof in 48 ml. of 2-methoxyethanol and 20 g. of furfurylamine is refluxed for 4 hours under nitrogen and concentrated to half of its volume under reduced pressure at about 65°. The concentrate is poured into the mixture of 112 ml. of 2 N hydrochloric acid and 57 ml. of ethanol, the mixture stirred ½ an hour under nitrogen and at 25°. It is filtered, the residue washed with 50 ml. of 50% aqueous ethanol, dried, taken up in 28.6 ml. of dimethylformamide, the solution added to 28.6 ml. of water, the precipittae formed filtered off and washed with 50 ml. anhydrous ethanol, to yield the N - furfuryl-4-chloro-5-(2-acetylaminophenylsulfamoyl)-anthranilic acid melting at 224–230° with decomposition.

Example 41

Preparation of 1000 tablets each containing 50 mg. of the active ingredient:

Formula:                                               G.
N-furfuryl - 4 - chloro-5-(2-aminophenylsul-
  famoyl)anthranilic acid _____   50.0
Lactose _____  190.0
Corn starch _____   25.0
Confectioners sugar _____    6.0
Talcum powder _____   10.0
Vegetable fat M.P. 60–63° _____    4.0
Purified water q.s.

Procedure: All the powders are passed through a screen with openings of 0.6 mm. Then the drug substance, lactose and sugar are mixed in a suitable mixer. The starch is suspended in 45 ml. of water and the suspension added to 180 ml. of boiling water. The paste formed is added to the powders, which are granulated, if necessary, with an additional amount of water. The granulate is dried overnight at 35°, broken on a screen with 1.2 mm. openings, combined with the talcum and fat, mixed thoroughly and compressed into tablets using concave punches with 7.1 mm. diameter, uppers bisected.

Example 42

Preparation of 1000 capsules, each containing 50 mg. of the active ingredient:

Formula:                                               G.
N-furfuryl - 4 - chloro - 5 - (2-aminophenylsul-
  famoyl)-anthranilic acid _____    50.0
Lactose _____  200.0
Talcum powder _____   25.0
Corn starch _____   15.0
Vegetable fat M.P. 60–63° _____   10.0

Procedure: All the powders are passed through a screen with openings of 0.6 mm. and mixed until homogenous.

No. 2 hard gelatine capsules are filled each with 300 mg. of the mixture, using a capsule filling machine.

I claim:

1. A compound having the formula

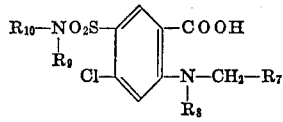

in which $R_{10}$ is phenyl, mono- or di-lower alkylphenyl, lower hydroxyalkylphenyl, mono- or dihydroxyphenyl, lower alkyl-hydroxyphenyl, mono- or di-mercaptophenyl, mono- or di-lower alkoxyphenyl, lower alkoxy-hydroxyphenyl, lower hydroxyalkoxyphenyl, mono- or di-lower alkylthiophenyl, mono- or di-halogenophenyl, trifluoromethylphenyl, nitrophenyl mono- or diaminophenyl, di-lower alkylaminophenyl, lower alkanoylaminophenyl, carboxyphenyl or lower carbalkoxyphenyl, $R_7$ is phenyl, lower alkyl-phenyl, furyl, lower alkylfuryl, thienyl, lower alkylthienyl, tetrahydrofuryl, lower alkyltetrahydrofuryl, dihydropyranyl or lower alkyldihydropyranyl, and each of $R_8$ and $R_9$ is hydrogen, methyl or lower alkanoyl; or the lower alkyl esters, the amide or (di-lower alkylamino)-lower alkyl amides, wherein di-lower alkylamino is separated from amido-nitrogen by at least 2 carbon atoms, the alkali metal, alkaline earth metal or ammonium salts of said anthranilic acids or therapeutically useful acid addition salts of the amino or di-lower alkylamino compounds.

2. A compound as claimed in claim 1, in which formula $R_7$ is phenyl, 2-furyl, 2-thienyl, 2-tetrahydrofuryl, 2-methyl-2-tetrahydrofuryl or 2,3-dihydro-2-pyranyl, each of $R_8$ and $R_9$ is hydrogen or acetyl and $R_{10}$ is phenyl, mono- or dimethylphenyl, 2-hydroxyethylphenyl, mono- or dihydroxyphenyl, methyl-hydroxyphenyl, mercaptophenyl, mono- or dimethoxyphenyl, methoxy-hydroxyphenyl, 2-hydroxyethoxyphenyl, fluorophenyl, chlorophenyl, trifluoromethylphenyl, nitrophenyl, mono- or diaminophenyl, dimethylaminophenyl, acetylaminophenyl, carboxyphenyl, carbomethoxyphenyl or carbethoxyphenyl; or the methyl or ethyl ester, 3-dimethylaminopropylamide, the sodium, potassium or 2-hydroxyethylammonium salts of the carboxylic acids or the hydrochlorides of the mono- or diamino or dimethylamino compounds.

3. A compound as claimed in claim 2 and being the N-furfuryl-4-chloro-5-phenylsulfamyl-anthranilic acid or the sodium salt thereof.

4. A compound as claimed in claim 2 and being the N - furfuryl - 4 - chloro-5-(hydroxyphenylsulfamyl)-anthranilic acid, or the sodium salt thereof.

5. A compound as claimed in claim 2 and being the N-furfuryl - 4 - chloro-5-(aminophenylsulfamyl)-anthranilic acid, the sodium salt or the hydrochloride thereof.

6. A compound as claimed in claim 5 and being the N - furfuryl-4-chloro-5-(2-aminophenylsulfamyl)-anthranilic acid, the sodium salt or the hydrochloride thereof.

References Cited

UNITED STATES PATENTS 3,567,714    3/1971    Wilson _____ 260—239.6
3,470,155    9/1969    Weinstock _____ 260—239.6
3,678,039    7/1972    Werner _____ 260—239.6

JOAN D. RANDOLPH, Primary Examiner

C. M. S. JAISLE, Assistant Examiner

U.S. Cl. X.R.

260—239.65, 239.7, 239.75, 239.8, 239.9, 239.95, 397.7; 424—228, 229